United States Patent
Shukla et al.

(10) Patent No.: US 10,970,189 B2
(45) Date of Patent: Apr. 6, 2021

(54) CONFIGURING DATA PROCESSING PIPELINES

(71) Applicant: Palantir Technologies Inc., Palo Alto, CA (US)

(72) Inventors: Saurabh Shukla, London (GB); Subbanarasimhiah Harish, London (GB); Harsh Pandey, New York, NY (US); Thomas Boam, Hertfordshire (GB); Vinoo Ganesh, New York, NY (US)

(73) Assignee: Palantir Technologies Inc., Denver, CO (US)

(*) Notice: Subject to any disclaimer, the term of this patent is extended or adjusted under 35 U.S.C. 154(b) by 157 days.

(21) Appl. No.: 16/362,129

(22) Filed: Mar. 22, 2019

(65) Prior Publication Data

US 2020/0210311 A1 Jul. 2, 2020

(30) Foreign Application Priority Data

Dec. 27, 2018 (GB) .................................. 1821239

(51) Int. Cl.
| | |
|---|---|
| *G06F 7/00* | (2006.01) |
| *G06F 11/34* | (2006.01) |
| *G06F 16/2455* | (2019.01) |
| *G06F 16/25* | (2019.01) |
| *G06F 11/30* | (2006.01) |

(52) U.S. Cl.
CPC ........ *G06F 11/3452* (2013.01); *G06F 11/302* (2013.01); *G06F 16/2456* (2019.01); *G06F 16/258* (2019.01)

(58) Field of Classification Search
CPC ............. G06F 11/3452; G06F 16/2465; G06F 16/258; G06F 11/302
USPC .................................................. 707/600–899
See application file for complete search history.

(56) References Cited

U.S. PATENT DOCUMENTS

| | | |
|---|---|---|
| 10,007,674 B2 | 6/2018 | Fink et al. |
| 2016/0125000 A1 | 5/2016 | Meacham et al. |
| 2018/0341651 A1 | 11/2018 | Anderson et al. |

FOREIGN PATENT DOCUMENTS

| | | |
|---|---|---|
| EP | 3258393 | 12/2017 |

OTHER PUBLICATIONS

Official Communication for European Patent Application No. 16194936.7 dated Mar. 9, 2017.
Official Communication for U.S. Appl. No. 15/262,207 dated Jun. 8, 2017.

*Primary Examiner* — Isaac M Woo
(74) *Attorney, Agent, or Firm* — Sheppard Mullin Richter & Hampton LLP

(57) ABSTRACT

Systems and methods are provided that are useful for configuring data processing pipelines. During building of a dataset in a data processing pipeline, statistics can be calculated relating to the dataset.

20 Claims, 5 Drawing Sheets

US 10,970,189 B2

CONFIGURING DATA PROCESSING PIPELINES

TECHNICAL FIELD

The subject innovations relate to configuring data processing pipelines.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data pipeline system is a collection of computer software scripts and programs, executed on computer hardware, for applying one or more transformations to one or more source datasets. A dataset may be built by processing of a source dataset, or multiple source datasets. Such processing involves transforming data of the source dataset to produce the new dataset. Transforming may involve processing multiple datasets in the production of a new dataset. For instance, two or more datasets may be joined to produce a new dataset. The new dataset is built as the source dataset or datasets, are transformed and the creation of the new dataset can be described as building the dataset. Furthermore, due to the distributed nature of certain abstractions of memory storage, wherein the source dataset is partitioned across several machines, the complete dataset is not readily available for immediate analysis. Thus, any operation performed on distributed datasets requires an initial step of building the complete source dataset before further processing can occur.

A data processing pipeline may have multiple stages in series, with a dataset produced by one stage being transformed by the next stage downstream.

SUMMARY

An embodiment of the present disclosure provides method performed by one or more processors, the method comprising: during building of a dataset in a data processing pipeline, calculating statistics relating to the dataset.

In some embodiments, the method further comprises updating statistics relating to the dataset as each row of the dataset is built. In some embodiments, the method further comprises building a row of the dataset by: applying a transformation to the row, updating statistics relating to the dataset for the row, and writing the transformed row to storage.

In some embodiments, the method further comprises using contents of at least one cell in the row to update the statistics relating to the dataset as the row of the dataset is built. In some embodiments, the method further comprises using the statistics in configuring one or more downstream transforms in the data processing pipeline. In some embodiments, the method further comprises using the statistics to optimise a join operation downstream in the data processing pipeline.

In some embodiments, the method further comprises presenting the statistics in a user interface and providing a control to allow a user to configure the data processing pipeline using the statistics. In some embodiments, the method further comprises presenting the statistics in a user interface and providing a control to allow a user to cease further processing of the dataset.

In some embodiments, the method further comprises generating a statistics configuration, and using the statistics configuration to calculate the statistics as the dataset is built.

In some embodiments, the method further comprises an optimizer automatically generating the statistics configuration. In some embodiments, the method further comprises generating the statistics configuration based on user configuration input to a user interface.

In some embodiments, the method further comprises automatically using the statistics relating to the contents of the dataset to rewrite code generated from user code in to change the execution order of data processing stages in the data processing pipeline.

Also provided are computer systems and programs comprising instruction that when executed by computing apparatus cause it to perform any method above.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Figure 1:
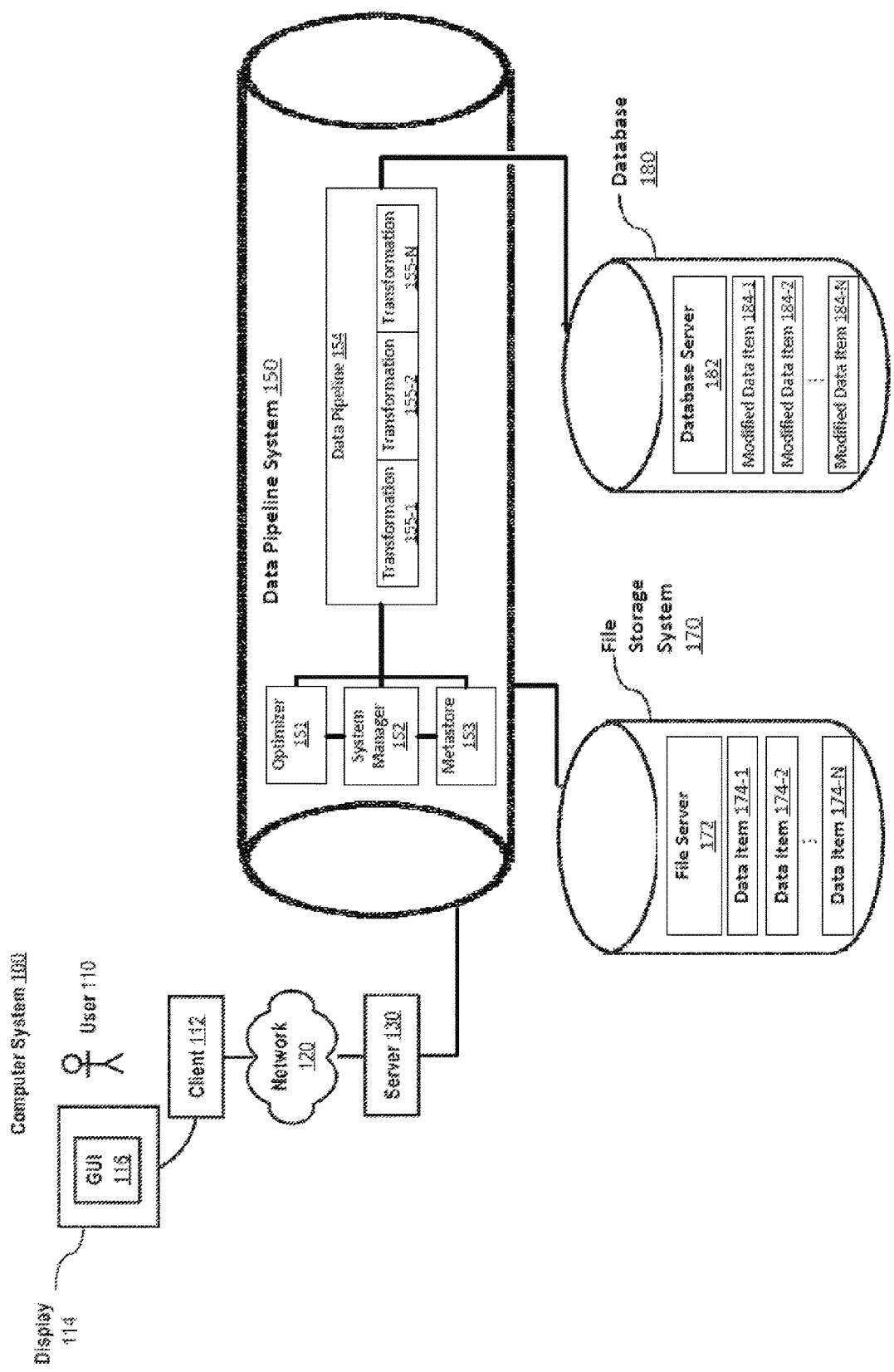
FIG. 1 is a block diagram illustrating an example of a computer system configured to provide transformations as part of a data processing pipeline, in accordance with example embodiments.

The detailed description set forth below is intended as a description of various configurations of the subject innovations and is not intended to represent the only configurations in which the subject innovations may be practiced. The appended drawings are incorporated herein and constitute a part of the detailed description. The detailed description includes specific details for the purpose of providing a thorough understanding of the subject innovations. However, the subject innovations are not limited to the specific details set forth herein and may be practiced without these specific details. In some instances, some structures and components are shown in block diagram form in order to avoid obscuring the concepts of the subject innovations.

General Overview

Apache Spark and other distributed analytics engines have the ability to queue jobs in a cost-based way. These systems can provide basic statistics about column distribution, in particular they can provide the maximum and minimum values in a given column of the dataset. Apache Spark has the ability to perform optimizations on data processing. Apache Hive is a separate open source technology that connects with Apache Spark, generates statistics and stores the statistics in a metastore. Producing statistics on datasets is computationally expensive in many systems and this is true in Apache Spark due to the Resilient Distributed Dataset (RDD) abstraction that Apache Spark utilizes, wherein a source dataset is partitioned across several machines.

Conventionally, when using a distributed analytics engine, for example Apache Spark, to build datasets, it is possible to calculate statistics relating to the datasets only once the dataset has been built. Particularly, statistics calculation is done at a later time, after processing by the whole of data processing pipeline has completed. As such, the statistics are not usable in the processing of the data in the pipeline. Apache Spark does not generate statistics relating to datasets unless the statistics are specifically requested by the user.

The subject innovations calculate statistics of data in datasets as the datasets are built in the data processing pipeline. Although this adds to the processing required at build time, during operation of the data processing pipeline, the statistics are available straight away upon build completion. The statistics are usable in optimising the operation of the data processing pipeline downstream. The information is useful in data validation (health checks'), and so can prevent invalid datasets from being further transformed (which would be a wasteful use of computing resources). It can be particularly useful in optimising a mechanism for joining datasets together downstream.

Additionally, there is the possibility that other systems can rely on the fact that statistics for the dataset are available upon building of the dataset, rather than having to wait for the statistics to be calculated later.

Example Computer System

FIG. 1 illustrates an example of a computer system 100 configured to perform transformations in a data processing pipeline. As shown, the computer system 100 includes a client computing device 112 used by a human user 110, a server system 130, a data pipeline system 150, a file storage system 170 and a database 180. The client computing device 112 and the server system 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of basic computing device 500 described below with respect to FIG. 4. The client computing device 112 may also include a web browser or a client application configured to display, in a graphical user interface 116 of the client computing device 112 display 114, a computer program for performing data processing pipelines. Such a computer program may allow the user to indicate the datasets 174 for transformation and where the transformed dataset 184 should be stored. It may also allow the user to specify other operations that should be performed by the data pipeline system 150. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server system 130 may include a data pipeline system control module which is capable of receiving instructions for a data processing pipeline from a client device 112 and requesting that the data pipeline system 150 perform the data processing pipeline. The server system 130 is advantageously implemented as multiple server computing devices arranged in a distributed or clustered computing arrangement. Each such server computing device may be composed of hardware components like those of basic computing device 500 described below with respect to FIG. 4.

The server system 130 may include one or more processors (e.g., CPUs), a network interface, and memory. The processor(s) may be configured to execute computer instructions that are stored in one or more computer-readable media, for example, the memory of the server system 130. The server system 130 may include a network interface that is configured to allow the server system 130 to transmit and receive data in a network, e.g., network 120 of FIG. 1. The network interface may include one or more network interface cards (NICs). The memory of the server system 130 may store data or instructions. The instructions stored in the memory may include the data pipeline system control module.

The data pipeline system 150 includes an optimizer 151, which is configured to optimize efficiency of dataset transformations and the operation of the data pipeline system 150 overall. In this representative embodiment, the input datasets are contained and received from the file storage system 170 and the transformed datasets are stored in the database 180. However, either or both of the input datasets 174 (e.g., 174-1, 174-2, 174-N) and the transformed datasets 184 (e.g., 184-1, 184-2, 184-N) may instead be present, retrieved from and/or stored to, any of the computing devices of the computer system 100. For example, the input datasets 174 may be present on and received from the database 180. They may also be present on, retrieved from and/or stored to any computing device or storage medium accessible, directly or indirectly, by the data pipeline system 150. The optimizer 151 configures the system manager 152, which performs the transformations on the input data sets 174. Statistics used by the optimizer 151 are stored in the metastore 153.

The data pipeline system 150 includes a system manager 152, which is configured to perform the transformations on the input data sets 174. The system manager 152 interacts with the metastore 153, storing information required for the transformations, including the statistics produced during the operation of the method of the present innovation. The system manager 152 is configured by the optimizer 151 to optimize the efficiency of dataset transformations as part of the data pipeline 154.

The data pipeline system 150 includes a metastore 153 which stores metadata of the input datasets 174, information required for the transformations 155, as well as including the statistics produced during operation of the method of the present innovation.

The data pipeline system 150 includes a data pipeline 154. This includes plural transformation items in series. In this example, a first transformation item 155-1 is the first in the series. A second transformation item 155-2 is downstream of the first transformation item 155-1. A third transformation item 155-3 is downstream of the second transformation item 155-2. During operation, a dataset is transformed by the first transformation item 155-1, and the resulting transformed dataset forms the input dataset for the second transformation item 155-2. This is transformed by the second transformation item 155-2, and the resulting transformed dataset forms the input dataset for the third transformation item 155-3. The resulting dataset is the final product of the data pipeline 154. As is described in detail below, statistics of the transformed datasets are calculated during building of the datasets by the transformations 155-1, 155-2 and 155-3. Also, the second transformation item 155-2 and/or the third transformation item 155-3 are configured using statistics from one or more upstream datasets.

The data pipeline system 150 may be implemented as a single server computing device or as multiple server computing devices arranged in a distributed or clustered computing arrangement. Each such server computing device may be composed of hardware components like those of basic computing device 500 described below with respect to FIG. 4.

The data pipeline system 150 may include one or more processors (e.g., CPUs), a network interface, and memory. The processor(s) may be configured to execute computer instructions that are stored in one or more computer-readable media, for example, the memory of the data pipeline system 150. The data pipeline system 150 may include a network interface that is configured to allow the data pipeline system 150 to transmit and receive data in a network, e.g., a network connecting the data pipeline system 150 and the file storage system 170 and a network connecting the data pipeline system 150 to the database 180, which may be the same or different network as the network that connects the data pipeline system 150 and the file storage system 170. The network interface may include one or more network interface cards (NICs).

The file storage system 170 may include a file server module 172 for storing and retrieving datasets 174. The file storage system 170 may be implemented as a single server computing device or as multiple server computing devices arranged in a distributed or clustered computing arrangement. Each such server computing device may be composed of hardware components like those of basic computing device 500 described below with respect to FIG. 4.

The file storage system 170 may include one or more processors (e.g., CPUs), a network interface, and memory. The processor(s) may be configured to execute computer instructions that are stored in one or more computer-readable media, for example, the memory of the file storage system 170. The file storage system 170 may include a network interface that is configured to allow the file storage system 170 to transmit and receive data in one or more networks, e.g., a network connecting the server system 130 and the file storage system 170 and a network connecting the data pipeline system 150 to the file storage system 170, which may be the same or different network as the network that connects the server system 130 and the file storage system 170. The network interface may include one or more network interface cards (NICs). The memory of the file storage system 170 may store data or instructions. The instructions stored in the memory may include the file server module 172.

The database 180 may include a database server module 182 for storing and retrieving database data including transformed datasets 184. The database 180 may be implemented as a single server computing device or as multiple server computing devices arranged in a distributed or clustered computing arrangement. Each such server computing device may be composed of hardware components like those of basic computing device 500 described below with respect to FIG. 4.

The database 180 may include one or more processors (e.g., CPUs), a network interface, and memory. The processor(s) may be configured to execute computer instructions that are stored in one or more computer-readable media, for example, the memory of the database 180. The database 180 may include a network interface that is configured to allow the database 180 to transmit and receive data in one or more networks, e.g., a network connecting the server system 130 and the database 180 and a network connecting the data pipeline system 150 to the database 180, which may be the same or different network as the network that connects the server system 130 and the database 180. The network interface may include one or more network interface cards (NICs). The memory of the database 180 may store data or instructions. The instructions stored in the memory may include the database server module 182.

The datasets 174 may be computer files of the same or different types. A dataset holds data within the transactional platform. Each dataset has a schema in order for sense to be made of the data within the dataset. The datasets 174 may also be rows of a database table, or entries contained in a document-oriented or objected-oriented database. The datasets may also be in-memory objects. It should be recognized that the types of datasets 174 are not limited to only one of the preceding categories and could be any number or combination of these categories. For example, some portion of the datasets could be files and some other portion could be database rows.

The types of the transformed datasets 184 could be any number of the types specified above. In addition, a transformed dataset could be an encrypted or decrypted rendition of the corresponding input dataset or some portion of it.

Example Statistics Calculation

Figure 2:
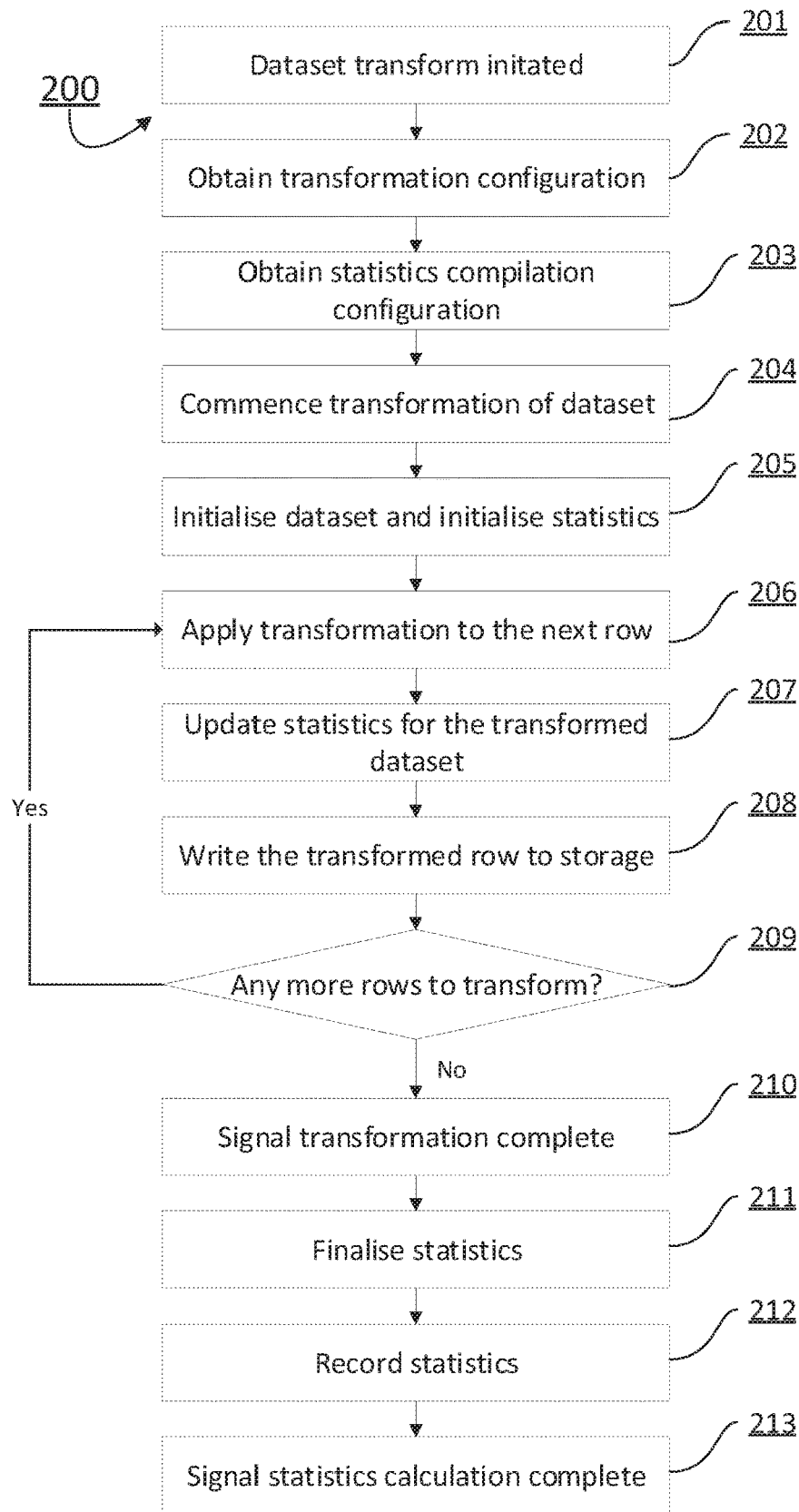
FIG. 2 is a flow diagram illustrating an example method by which statistics are calculated during building of a dataset.

FIG. 2 is a flowchart illustrating an example method 200 by which statistics are calculated during building of a dataset in a transformation provided within the data processing pipeline 154. The method 200 is performed by computer-readable instructions, e.g. software, for execution by one or more processors of one or more computing devices (e.g., the basic computing device 500 of FIG. 4). In various embodiments, the one or more computing devices are part of the data pipeline system 150.

At step 201, the dataset transformation is initiated. Initiation may occur for instance, in response to a user operating a control of a user interface. Alternatively, it may be initiated automatically by the data pipeline system 150.

A configuration of the dataset transformation is obtained at step 202. The configuration may for instance be read from a configuration file, or may be input into a user interface by a user.

Configuration information for the statistics compilation is obtained in step 203. The configuration of the statistics may for instance be read from a configuration file, or may be input into a user interface by a user. If the configuration of the statistics is read from a configuration file, the configuration file may have been created by a user of the system or it may have been created automatically by the data pipeline system 150.

At step 204, the transformation of the dataset is commenced by the system manager 152.

At step 205, the dataset is initialized, and the statistics for the transformed datasets are initialized. Initialization of the statistics for the transformed datasets prior to the first row of the dataset being transformed enables the statistics provided once the build has completed to relate only to the transformed dataset.

At step 206, the transformation is applied to the next row of the dataset by the system manager 152. Upon the first performance of step 206, it is the first row of the dataset that is transformed. The transformation of the row of the dataset is executed in accordance with the transformation configuration that was obtained in step 202.

At step 207, statistics for the transformed dataset stored in the metastore 153 are updated. Upon first execution of step 207, updating the statistics for the transformed dataset comprises the system manager 152 writing initial statistics data to the metastore 153.

At step 208, the transformed row is written to storage.

This completes the transaction of transforming the row of the dataset. The transformation of the row of the dataset involved the system manager 152 transforming the row, using the transformation configuration information, updating the statistics for the transformed datasets stored in the metastore 153, and writing the transformed row to storage. It will be appreciated that the sequence of step 207 and 208 could be reversed, i.e. the transformed row could be written to storage before the statistics for the transformed datasets are updated.

At step 209, a determination is made as to whether there are any further rows of the datasets to transform. If all of the rows of the dataset have been transformed, a negative determination is made and the method 200 proceeds to step 210. If there are further rows to transform, a positive determination is made at step 209 and the method 200 returns to step 206.

Steps 206, 207 and 208 are then performed for the next row of the dataset.

The method 200 continues to loop through step 206, 207 and 208 until all of the rows of the dataset have been transformed, upon which the method 200 continues to step 210.

Once the method 200 reaches step 210, the completion of the transformation is signaled, for instance by completion of a flag or by sending a message to an appropriate module within the system.

Next, at step 211, the statistics are finalized. This involves deleting any temporary data and formatting the statistics into a suitable form.

Following step 211, the statistics as finalized are recorded at step 212. The statistics may be recorded in the metastore 153, or at any other suitable location.

Next, at step 213, the completion of the statistics calculation is signaled. This signaling can be carried out for instance by completion of a flag or by sending a message to an appropriate module within the system. This step can be omitted if signaling is not required.

Lastly, the method 200 ends at step 214.

The updating of statistics for the transformed dataset that is performed at step 207 depends on the statistics that are being calculated, which depends on the statistics compilation configuration information that was obtained at step 203.

In the case of the statistics including a mean average value of contents of cells in a particular column, the updating of the statistics that is performed at step 207 involves summing the value of the cell in the row that is currently being processed with the sum total from the previous row, and incrementing a row counter. As such, once all of the rows have been processed, the result has two parts: a value that is equal to the sum of the contents of all of the cells of the column, and the number of rows in the dataset. In this case, the finalizing of the statistics at step 211 involves dividing the sum by the number of the rows, in order to obtain the mean value. Significantly, the mean value of the contents of the cells is achieved without requiring the reading of any cell contents after the dataset has been transformed. Instead, it is achieved by suitable processing of data from the individual rows of the dataset as the transformation takes place, and as the dataset is built.

In the case of the statistics including a maximum value of the contents of cells in a given column, updating the statistics at step 207 involves comparing the value of the contents of the cell in the column of the row currently being processed to a value resulting from the updating of the statistics in respect of the previous row. If the value of the contents of the cell in the column of the row currently being processed is greater than the value from the updating of the statistics in respect of the previous row, then the value is updated to the value of the contents of the cell in the column of the row currently being processed. If the value of the contents of the cell in the column of the row currently being processed is less than or equal to the value from the updating of the statistics in respect of the previous row, then no change is made to the value.

In the case of the statistics including a minimum value of the contents of cells in a given column, updating the statistics at step 207 involves comparing the value of the contents of the cell in the column of the row currently being processed to a value resulting from the updating of the statistics in respect of the previous row. If the value of the contents of the cell in the column of the row currently being processed is less than the value from the updating of the statistics in respect of the previous row, then the value is updated to the value of the contents of the cell in the column of the row currently being processed. If the value of the contents of the cell in the column of the row currently being processed is greater than or equal to the value from the updating of the statistics in respect of the previous row, then no change is made to the value.

In the case of the statistics being the uncompressed size of the dataset, updating the statistics for a row includes adding the uncompressed size of the row currently being processed to the running total resulting from the processing of the previous row.

In the case of the statistics being the number of rows in the dataset, updating the statistics for a row includes incrementing a row counter.

In the case of the statistics being the count of the number of rows having a certain value or character string in a column, updating the statistics for a row includes incrementing a counter if it is determined that the contents of the cell for the relevant column is the same as the value or character string for which a count is required. If statistics relating to the counts of multiple values or character strings are required, a separate count is recorded for each of the values and character strings.

Multiple different statistics can be calculated during building a dataset, and multiple different statistics can be useful in many instances.

Calculating statistics has a computational cost associated with it. The cost is significantly lower than the cost of calculating the statistics after the dataset has been written to disk or other memory. However, the computational cost of calculating the statistics slows down the transformation process.

The level of statistics generation can be configured. If there is a requirement to complete a transformation within a certain time, then the statistics generation can be set to calculate only basic statistics when building the dataset. Conversely, if there are no time constraints, then the statistics generation is configured to calculate more advanced statistics.

With some transactional platforms, it is known what will be happening to the dataset downstream. If it is known that the dataset will not be the subject of a join operation downstream, the statistics generation is configured such as not to calculate statistics that are useful only for join operations.

If it is known that there is a requirement to perform a complex join operation on a dataset that is being built in a transformation downstream of that transformation, the statistics generation is configured such as to do advanced statistic calculations in order to simplify the downstream complex join operation.

Apache Spark, like some other distributed analytics engines, is not modelled as an atomic system, and as such it does not include a facility for performing 'append' transactions, by which a dataset is appended to another dataset. However, by pairing Apache Spark with a transactional platform, Apache Spark can be enabled to perform append transactions. In a transformation involving an append transaction, one dataset is appended to the end of another dataset such as to build a new dataset.

When using an append transaction in a transformation, particular savings of computational resources can be made. For instance, if it is required to append a dataset of 10,000 rows to a dataset of one billion rows, calculating statistics for the resulting dataset as the dataset is built involves obtaining the statistics for the original (one billion row) dataset, and updating the statistics on a row by row basis as the rows of the smaller dataset are appended thereto. It is not needed to calculate statistics for the whole of the resulting dataset; instead the statistics for the large dataset are updated as the append transformation is applied.

For very large datasets, calculating the statistics for a new dataset can be very computationally expensive. Conversely, calculating statistics for a new dataset using only statistics from the datasets from which the new dataset was formed using an append transaction is computationally inexpensive. This is true of the process of actually calculating the statistics, but also it avoids the situation where the new dataset is written to disk (or other storage) and then is read back from the disk in order to calculate the statistics. Thus, there is lower disk utilisation and, where the disk is not local, less utilisation of communication resources. There is also a much shorter time to the statistics being provided.

For some types of statistics, statistics for the dataset resulting from a transformation comprising an append transaction can be calculated very efficiently. For instance, the maximum and minimum value statistics for data in a column of the new dataset is calculated from the maximum and minimum value statistics for the column in the two original datasets (the maximum is the larger of the maximum values for the original datasets, and the minimum is the smaller of the minimum values for the two datasets). Also, the number or rows statistic of the new dataset is obtained by summing the number of rows of the two original datasets. Other statistics can be derived from the statistics of the two original datasets, without requiring the statistics to be calculated from examination of the new dataset. In Apache Spark and other such systems, statistics for a dataset are not calculated from statistics for precursor datasets; instead they must be calculated by examination of the new dataset.

Furthermore, the statistics for the new dataset can be calculated even before the new dataset has been built. Clearly this is not possible in a conventional system. Being able to calculate the statistics before the dataset is built can be useful. For instance, if the statistics for the new dataset do not comply with one or more requirements for the dataset, then the data processing pipeline may refrain from performing the append transaction altogether, thus saving computational resources that would have resulted in a dataset that was not usable.

It will be appreciated from the above explanation that the method 200 of FIG. 2 results in the generation of statistics for the dataset as the dataset is built, and without requiring multiple reads of any of the rows of the dataset. It will also be appreciated that the method 200 cannot produce statistics that require multiple reads of rows. If such is required, these statistics are generated by the distributed analytics engine (e.g. Apache Spark) by the issue of a suitable command after the dataset has been built.

Example Configuration of Transformations

Figure 3:
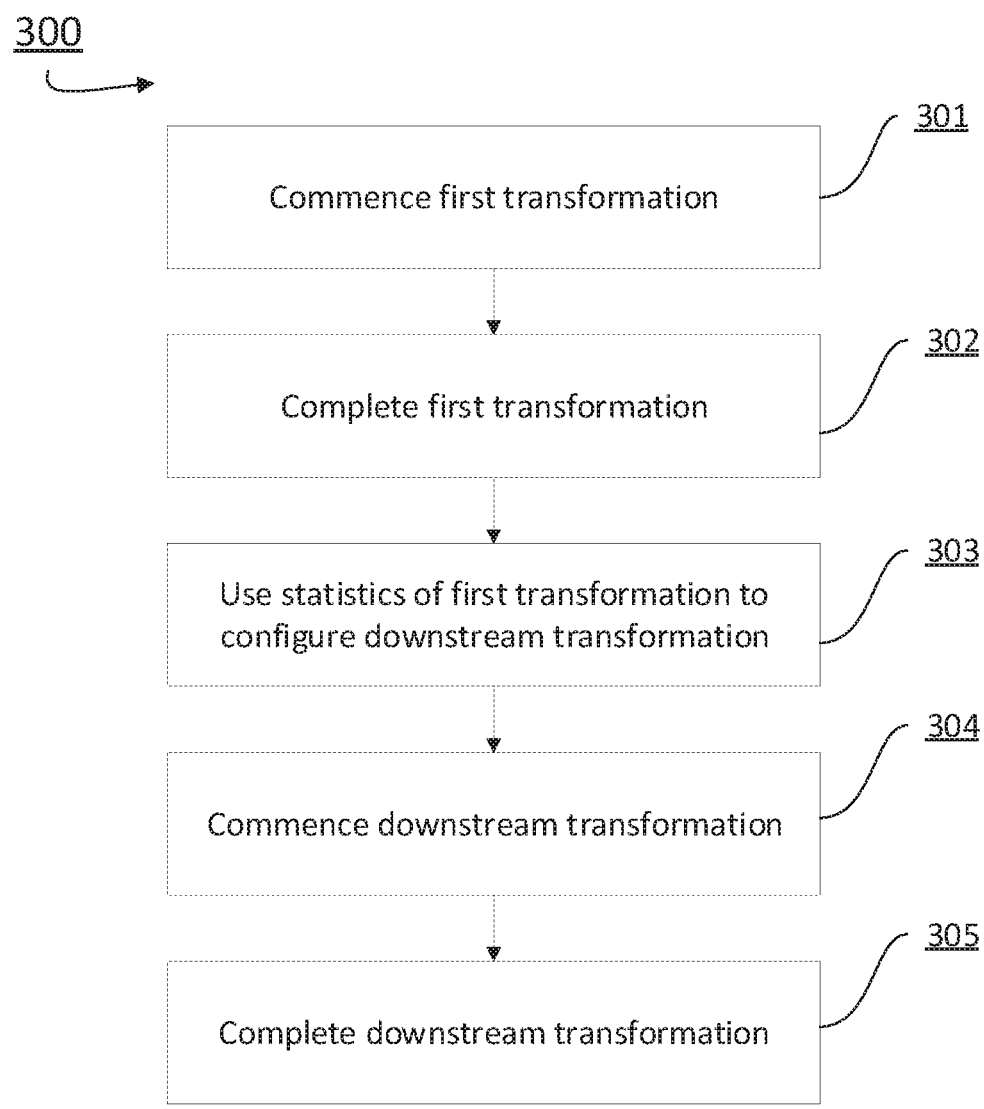
FIG. 3 is a flow diagram illustrating an example method by which statistics are used in configuring data processing pipeline operations.

FIG. 3 is a flowchart illustrating an example method 300 by which statistics generated during building of a dataset in a transformation are used to configure other, downstream parts of the data processing pipeline. The method 300 is performed by computer-readable instructions, e.g. software, for execution by one or more processors of one or more computing devices (e.g., the basic computing device 500 of FIG. 4). In various embodiments, the one or more computing devices are part of a data pipeline system 150.

The method 300 begins at step 301, where the first transformation is commenced by the system manager 152. The first transformation is for instance performed by the method 200 of FIG. 2. As such, statistics are calculated during the building of the dataset through the first transformation and stored in the metastore 153. At step 302, the first transformation completes.

At step 303, statistics calculated during the building of the dataset during the first transformation are used by the optimizer 151 to configure a downstream transformation.

At step 304, the downstream transformation is commenced by the system manager 152, using the configuration from step 303.

At step 305, the downstream transformation is completed. Because the downstream transformation was configured by the optimizer 151 using statistics from the first transformation (upstream), the downstream transformation was executed more efficiently than would have been the case in the absence of the use of the statistics from the first transformation in the configuration of the downstream transformation.

In one example, calculated statistics of a size of the dataset built during performance of the first transformation are used by the optimizer 151 to decide what process the system manager uses to join the dataset with another dataset in the second transformation. For instance, depending on whether the size of the dataset is below or above a threshold a decision is made by the optimizer 151 to cause the system manager 152 to broadcast (streaming of the dataset to every distributed node of the distributed analytics engine) or alternatively to perform a "sort merge join" operation, which is a slow process. Thus, having the statistics (in this example, the size of the dataset) can allow the optimizer 151 to optimize the mechanism by which the system manager 152 joins datasets together in a downstream transformation.

When Apache Spark runs a computation, it is not running user code. Instead, it performs codegen, which generates Java code. The Java code is executed by Apache Spark. The Java code is generated as a very long string, which makes it difficult for it to be interpreted by human users.

The optimizer 151 provides a feature of intermediary representation, which is a structural method of displaying the string for easy representation. The optimizer 151 is configured to rewrite this code, thereby to change the transformation, based on the statistics. For instance, the optimizer 151 is configured to decide based on the statistics what kind of joins to do and rewrite the Java code such as to cause the system manager 152 to perform the joins that are most optimal for a particular transformation or the overall data processing pipeline.

The Java code is intercepted by the optimizer 151 and rewritten by the optimizer 151 as appropriate. A user can be provided with a control through a user interface by which they can choose whether or not to cause the optimizer 151 to rewrite the Java code.

In one example, the optimizer 151 observes that one dataset is much smaller than another dataset that is to be joined with it, and changes the user setting of a join operation to a different type of join operation. There is no changing of user code, just changing of the Java code. This happens transparently, and is not visible to the user. It can alternatively be communicated to the user, following which the user can operate a control provided by a user interface to make changes to how the transformation is performed.

One type of transformation configuration is deciding whether or not to perform a downstream data transformation based on validation of a dataset using statistics for the dataset. If the data transformation is not carried out, then the pipeline does not complete.

For example, statistics for a dataset are examined by the optimizer 151, which determines whether the dataset is valid. If the dataset is invalid, then the optimizer 151 ceases the processing without causing the system manager 152 to perform the next transformation. In particular, the optimizer 151 can cause an alert to be provided to the user. The optimizer 151 may also provide a control by which the user can override the ceasing of processing. An example of an invalid dataset is a dataset having a critical field, e.g. date field, in which it is not permitted to use data that is out of date. Data is validated by the optimizer 151 to check that data field is not null in all rows of the dataset, by calculating statistics during the building of the dataset regarding the count of null fields in the 'date' column. If this validation fails, the optimizer 151 ceases processing by the system manager 152, as described above. The same concept is usable for validation other data. Generally speaking, this can be said to provide reliable column check results.

In another example, statistics relating to a distribution of values in a particular column of multiple datasets are calculated as the datasets are built. For instance, the multiple datasets may be generated from one dataset using different transformations. The optimizer 151 uses the statistics relating to the distributions of values to select one or more datasets for further processing by the system manager 152, and does not further process the datasets that have less interesting distributions. Not processing datasets saves lots of computational resources.

The statistics can be used also to provide users with an estimate of time that will be needed to perform transformation and complete data processing pipeline. For instance, the optimizer 151 can estimate the time needed for a transaction by performing a calculation based on the complexity of the transformation and the size of the dataset, as identified from the statistics for the dataset. The optimizer 151 can also effect appropriate scheduling of jobs in a shared computing system using the transformation time estimate information.

Basic Computing Device

Figure 4:
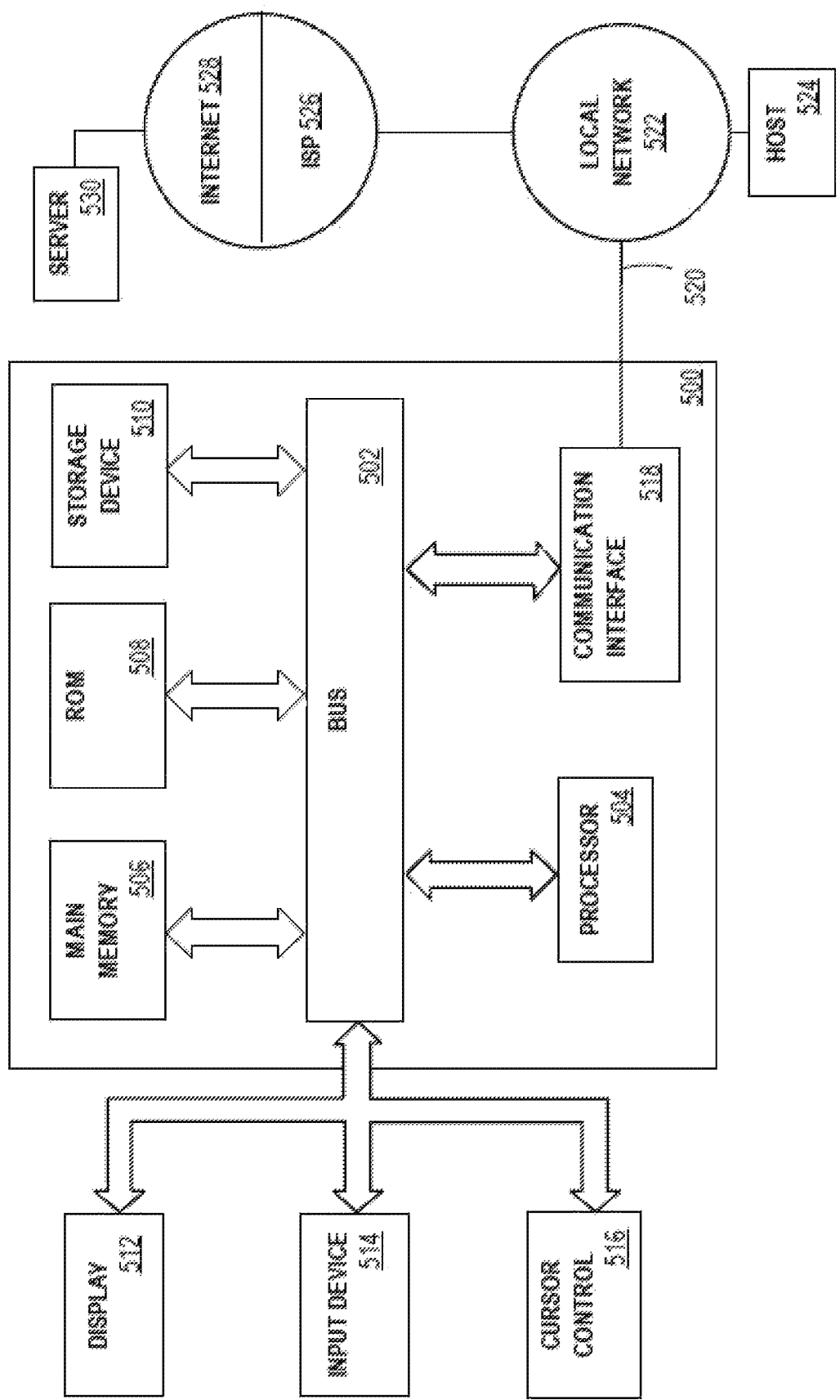
FIG. 4 is a schematic diagram of a computing device in which software-implemented processes of the example embodiments may be embodied.

Referring now to FIG. 4, it is a block diagram that illustrates a basic computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Figure 5:
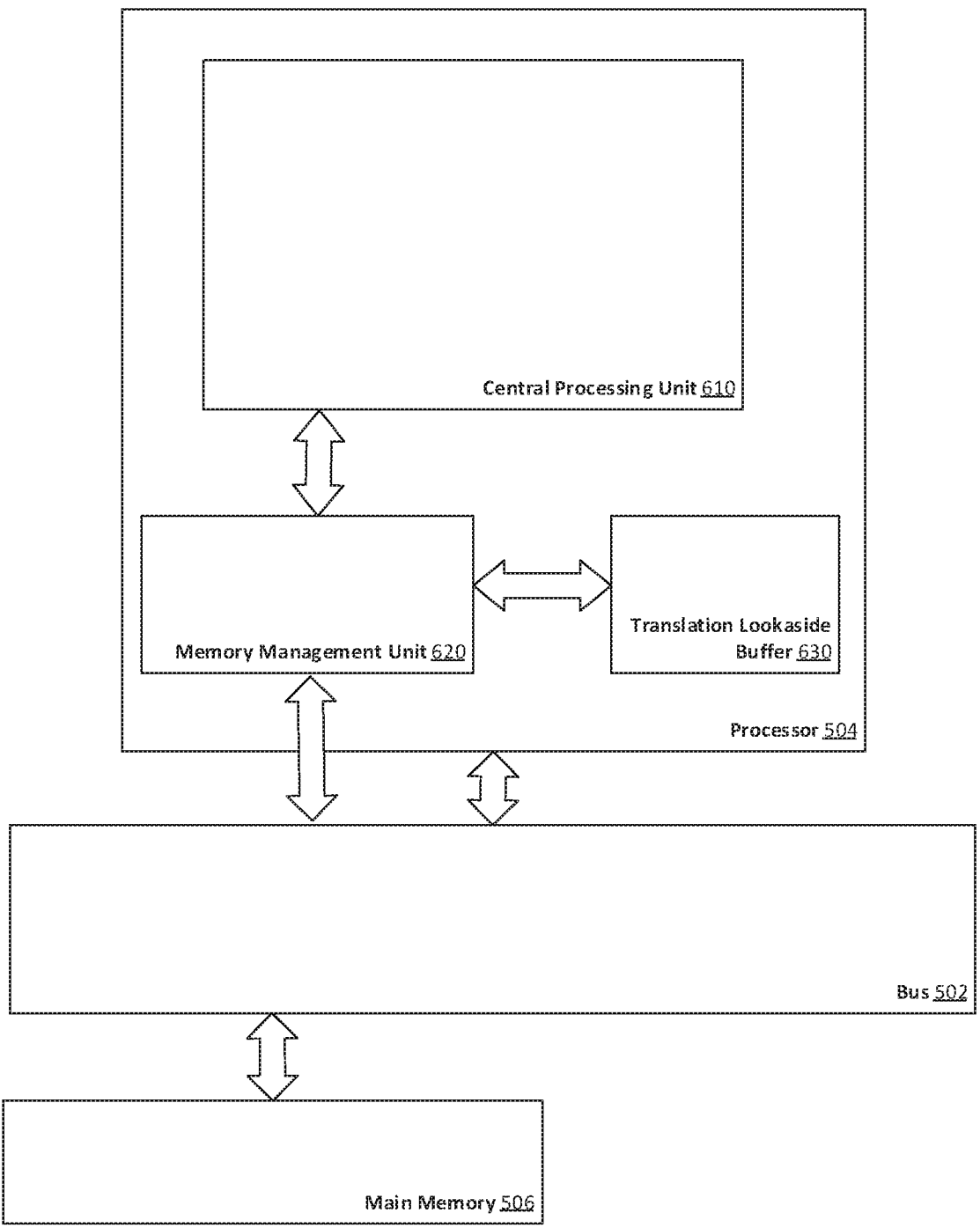
FIG. 5 is a block diagram of components of an example processor suited to implement the methods of the example embodiments.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Basic Processor

Referring now to FIG. 5, it is a block diagram that illustrates an example embodiment of the processor 504 upon which methods performing the subject innovations may be executed. Processor 504 and its components, including their connections, relationships, and functions, is meant to be exemplary only, and not meant to limit implementations of the subject innovations. Other processors suitable for performing the relevant methods may have different components, including components with different connections, relationships, and functions.

The central processing unit (CPU) 610 is the part of the processor that is responsible for the execution of code instructions and controlling the other modules of the processor 504. The CPU may also perform a wide array of other functions, such as interacting through the bus 502 with the other components of the computer system 500.

The memory management unit (MMU) 620 is responsible for managing interactions between the CPU 610 and the main memory 506. The instructions of a computer process running on CPU 610 will contain references to virtual memory addresses rather than the physical address in main memory 506 where the process data is stored. The MMU 620 translates between these virtual addresses and the physical address in main memory needed to actually access the data.

Virtual addresses are used for several reasons. First, a computer process is unlikely to know in advance where it will be stored in main memory 506. The use of virtual addresses allows the process to be stored anywhere in main memory 506. The memory assigned to a process is presented to it as a contiguous range known as a virtual address space. However, the physical addresses to which this virtual address space is assigned need not be contiguous. This allows it to use gaps between other processes in main memory. These sections may have previously been assigned to now closed processes.

The use of virtual addresses also allows the MMU 620 to provide memory protection. Memory protection refers to only allowing a process to access the section of physical memory assigned to its virtual address space. Using virtual addresses allows the MMU 620 to ensure that all of the virtual addresses are translated in to physical addresses that the process is allowed to access or, if an address outside the virtual address space is attempted to be accessed, return an error. This prevents processes from interfering with one other.

To provide this functionality, a mapping between virtual addresses and physical memory address is kept. This mapping is known as a page table as it is a mapping between small sections, known as pages, of physical and virtual memory. The page table could be kept in main memory 506. However, this would mean that two main memory 506 accesses would be needed for every virtual address access performed. The MMU 620 would need to first access main memory to receive the relevant part of the page table. The correct physical address for the requested virtual address is then determined by the MMU 620. The memory access is then performed using the physical address. Requiring two main memory 506 accesses has a significant performance impact as accessing main memory is much slower than performing operations on the processor 504.

To minimize the number of memory accesses required, a component known as a translation lookaside buffer (TLB) 630 may be provided. The translation lookaside buffer (TLB) 630 is a small, fast cache for storing page table entries. The TLB is typically implemented as a content addressable memory but may be implemented using any suitably fast memory.

While the TLB 630 is typically not large enough to store all of the page table, or even the entire page table for a given process, it can store the parts of the page table that the MMU 620 expects to be used imminently. Various algorithms, with both hardware and software implementations, are known in the art to optimize which part of the page table is stored in the TLB 630.

The mappings stored in the TLB 630 are used to translate from physical to virtual addresses without an additional main memory access. When the MMU 620 attempts to access a virtual address whose mapping is not present in the TLB 630, the MMU 620 loads the relevant mapping from main memory 504. The relevant mapping is used by the MMU and/or stored in the TLB 630 for future use.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method performed by one or more processors of a data processing pipeline, the method comprising:
   receiving a source dataset from a source file storage system;
   compiling a dataset from the source dataset, wherein compiling the dataset from the source dataset comprises:
   applying one or more transformations to each row of the source dataset, wherein at least one transformation includes an encryption to a row of the source dataset;

determining, based on the one or more transformations to each row of the source dataset, statistics for each corresponding row of the dataset as the dataset being compiled; and storing the dataset and the statistics for each row of the dataset to a database; and during compilation of the dataset in the data processing pipeline, determining statistics relating to the dataset.

2. The method of claim 1, further comprising updating the statistics relating to the dataset as each row of the dataset is being compiled.

3. The method of claim 1, further comprising updating the statistics for each row of the dataset to a least one cell of a row of the dataset as the row of the dataset is being compiled.

4. The method of claim 1, further comprising configuring, based on the statistics relating to the dataset, one or more downstream transformations associated with the data processing pipeline.

5. The method of claim 4, further comprising optimizing, based on the statistics relating to the dataset, a join operation associated with the data processing pipeline.

6. The method of claim 1, further comprising presenting the statistics relating to the dataset in a user interface, and providing a control to allow a user to configure the data processing pipeline based on the statistics.

7. The method of claim 1, further comprising presenting the statistics relating to the dataset in a user interface, and providing a control to allow a user to cease further processing of the dataset by the data processing pipeline.

8. The method of claim 1, further comprising generating a statistics configuration, and determining, based on the statistics configuration, the statistics relating to the dataset as the dataset is being compiled.

9. The method of claim 8, further comprising optimizing the one or more transformations based on the statistics configuration.

10. The method of claim 8, further comprising generating the statistics configuration based on a configuration input received through a user interface.

11. The method of claim 1, further comprising changing an execution order of data processing stages associated with the data processing pipeline based on the statistics relating to the dataset, wherein changing the executing order of the data processing stages comprises rewriting user code based on the statistics relating to the dataset.

12. A system configured for a data processing pipeline, the system comprising:

one or more processors; and a memory storing instructions that, when executed by the one or more processors, cause the system to perform:

receiving a source dataset from a source file storage system;

compiling a dataset from the source dataset, wherein compiling the dataset from the source dataset comprises:

applying one or more transformations to each row of the source dataset, wherein at least one transformation includes an encryption to a row of the source dataset;

determining, based on the one or more transformations to each row of the source dataset, statistics for each corresponding row of the dataset as the dataset being compiled; and storing the dataset and the statistics for each row of the dataset to a database; and during compilation of the dataset in the data processing pipeline, determining statistics relating to the dataset.

13. The system of claim 12, wherein the instructions, when executed, further cause the system to perform updating the statistics relating to the dataset as each row of the dataset is being compiled.

14. The system of claim 12, wherein the instructions, when executed, further cause the system to perform updating the statistics for each row of the dataset to a least one cell of a row of the dataset as the row of the dataset is being compiled.

15. The system of claim 12, wherein the instructions, when executed, further cause the system to perform configuring based on the statistics relating to the dataset, one or more downstream transformations associated with the data processing pipeline.

16. The system of claim 15, wherein the instructions, when executed, further cause the system to perform optimizing, based on the statistics relating to the dataset, a join operation associated with the data processing pipeline.

17. The system of claim 12, wherein the instructions, when executed, further cause the system to perform presenting the statistics relating to the dataset in a user interface, and providing a control to allow a user to configure the data processing pipeline based on the statistics.

18. A non-transitory computer readable medium of a computing system configured for a data processing pipeline storing instructions that, when executed by one or more processors the computing system, cause the computing system to perform:

receiving a source dataset from a source file storage system;

compiling a dataset from the source dataset, wherein compiling the dataset from the source dataset comprises:

applying one or more transformations to each row of the source dataset, wherein at least one transformation includes an encryption to a row of the source dataset;

determining, based on the one or more transformations to each row of the source dataset, statistics for each corresponding row of the dataset as the dataset being compiled; and storing the dataset and the statistics for each row of the dataset to a database; and during compilation of the dataset in the data processing pipeline, determining statistics relating to the dataset.

19. The non-transitory computer readable medium of claim 18, wherein the instructions, when executed, further cause the computing system to perform updating the statistics relating to the dataset as each row of the dataset is being compiled.

20. The non-transitory computer readable medium of claim 18, wherein the instructions, when executed, further cause the computing system to perform updating the statistics for each row of the dataset to a least one cell of a row of the dataset as the row of the dataset is being compiled.

* * * * *